US005331260A

United States Patent [19]

Ahmed

[11] Patent Number: 5,331,260

[45] Date of Patent: Jul. 19, 1994

[54] SYSTEM FOR CONTROLLING POWER WINDOWS OF VEHICLES

[75] Inventor: Moin Ahmed, Holly, Mich.

[73] Assignee: Chrysler Corporation, Highland Park, Mich.

[21] Appl. No.: 3,035

[22] Filed: Jan. 11, 1993

[51] Int. Cl.[5] .......... H02P 1/22

[52] U.S. Cl. .......... 318/282; 318/286; 318/264; 318/266; 318/468; 200/5 R

[58] Field of Search .......... 318/280-294, 318/460-469; 200/5-6, 4, 315, 517, 409, 339, 61.54, 61.57; 307/9, 10, 115, 112, 41; 340/438

[56] References Cited

U.S. PATENT DOCUMENTS

| | | | |
|---|---|---|---|
| 3,400,232 | 9/1968 | Mathey | 200/18 |
| 4,584,546 | 4/1986 | Hattori et al. | 200/6 BB X |
| 4,701,629 | 10/1987 | Citroen | 307/10 R |
| 4,795,862 | 1/1989 | Linden | 200/6 A |
| 4,801,812 | 1/1989 | Brusasco | 307/10 R |
| 4,899,063 | 2/1990 | Suck | 307/9.1 |
| 5,038,086 | 8/1991 | Ahmed et al. | 318/286 |
| 5,053,592 | 10/1991 | Zuercher | 200/5 A X |
| 5,089,715 | 2/1992 | Kokubu | 307/10.1 |
| 5,130,506 | 7/1992 | Zuercher et al. | 200/5 A X |
| 5,140,235 | 8/1992 | Ahmed et al. | 318/286 |
| 5,149,924 | 9/1992 | Pricsemuth | 200/5 R |
| 5,187,381 | 2/1993 | Iwasa et al. | 307/10.1 |

*Primary Examiner*—Paul Ip
*Attorney, Agent, or Firm*—Wendell K. Fredericks

[57] ABSTRACT

A system for controlling power windows of vehicles includes a module mounted on a console between the driver and passenger seats of a vehicle having front and rear sets of power windows with a separate switch module for operating each rear window proximate that window. The console includes a pair of operating switches for the front windows and a rotary selector switch movable between first and second positions. When the rotary selector switch is in the first position, the front operating switches raise and lower the front windows and the rear operating switches raise and lower the rear windows. When the selector switch is in the second position, the rear operating switches are disabled as are the motors for the front windows, while the front operating switches are connected through to the motors to operate the rear windows. This arrangement allows the driver to operate both the front windows and rear windows with a single pair of switches and to selectively prevent a child or other person sitting in the rear seat from operating the rear windows.

7 Claims, 4 Drawing Sheets

FIG. 5

| WINDOW | ROTARY SW | | LT FRT SWITCH | | RT FRT SWITCH | | ACTIVE MOTOR |
|---|---|---|---|---|---|---|---|
| | | | UP | DN | UP | DN | |
| LT FRT UP | a-1 | 2-b | P | O | O | O | LFM |
| LT FRT DN | b-2 | 1-a | O | P | O | O | LFM |
| RT FRT UP | f-6 | 7-g | O | O | P | O | RFM |
| RT FRT DN | g-7 | 6-f | O | O | O | P | RFM |
| LT RR UP-1 | b+ | 3-c | P | O | O | O | LRM |
| LT RR UP-2 | a-1' | 2'-b | P | O | O | O | LRM |
| LT RR DN-1 | b+ | 3-c | O | P | O | O | LRM |
| LT RR DN-2 | b-2' | 1'-a | O | P | O | O | LRM |
| RT RR UP-1 | b+ | e-5 | O | O | P | O | RRM |
| RT RR UP-2 | f-6' | 7'-g | O | O | P | O | RRM |
| RT RR DN-1 | b+ | e-5 | O | O | O | P | RRM |
| RT RR DN-2 | g-7' | 6'-f | O | O | O | P | RRM |

SYSTEM FOR CONTROLLING POWER WINDOWS OF VEHICLES

Field of the Invention

The instant invention relates to a system for controlling power windows of vehicles, and more particularly, the instant invention relates to a system for controlling power windows of vehicles wherein the vehicles include sets of front and rear windows in which each window of a set is individually controllable by switches on a module position between driver's seat and front passenger's seat.

Background of the Invention

Most four door vehicles with electrically operated power windows have a control module proximate the driver's seat. The module may be located between two front seats in a five passenger vehicle or on the driver's side door of a six passenger vehicle. In currently used configurations, the module includes a separate rocker or pushbutton switch for each window so that there are four rocker switches thereon. In addition to the rocker switches, the module usually includes a locking switch providing a feature for locking the rear windows so that children in the back seat cannot operate the windows without the driver unlocking the windows. This results in an array of five switches operable by the driver.

When a driver decides to open or close any window or to lock or unlock the rear windows, it is preferable that this task be as simple as possible.

In addition to the aforedescribed considerations, it is also desirable to decrease the expense of the various systems utilized in an automobile. If the expense of a particular system may be reduced while not compromising desirable qualities of the vehicle, then so much the better. If it is possible to reduce expense while enhancing other qualities of the vehicle, then the reduction in expense is certainly desirable. One way of reducing expense of a system is to reduce the number of components of the system. While this reduction in components may save only a modest amount per vehicle, if thousands of vehicles utilize the improvement, then the savings to the manufacturer and consumer can be significant, especially when combined with other cost reduction measures.

SUMMARY OF THE INVENTION

In view of the aforementioned considerations, it is an object of the instant invention to provide a new and improved system for controlling power windows wherein operation of the systems are simplified while decreasing the expense of the systems.

Upon further study of the specification and appended claims, further objects and advantages of this invention will become apparent to those skilled in the art.

In view of these objections and other objects, the instant invention contemplates a system for operating power windows in a vehicle having left and right front power windows and left and right rear power windows, wherein the power windows are raised and lowered by individual motors coupled thereto. A module mounted on a console is located proximate the front seats of the vehicle. The module has left and right front operating switches for the left and right front windows and a mode selection switch moveable between first and second positions to select first and second modes. Left and right rear operating switches for the left and right rear windows are also located proximate the rear windows. A power and control circuit having a power source connected to ground is provided with the mode selection switch connected in the circuit. The power and control circuit connects each of the motors to its associated operating switch when in the first mode so that current flows from the power source through the selected operating switch and motor to ground for any one or all of the operating switches. When the mode selection switch is in the second mode, placing the power and control circuit in the second mode, the left and right rear motors are connected to the circuitry by the left and right front operating switches, while the left and right front electric motors are disconnected from the circuitry as are the left and right rear operating switches. Consequently, when the power and control circuit is in the second mode, the rear windows are operated only by operating the left and right front operating switches.

In accordance with a preferred embodiment of the invention, a rotary switch is utilized as the mode selection switch while DPDT rocker switches are used as the operating switches.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 5 is a truth table for the circuit when operating in the first and second modes.

DETAILED DESCRIPTION

Figure 2:
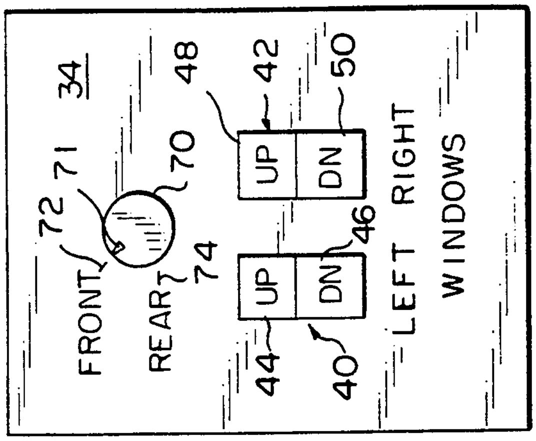
FIG. 2 is an enlarged planar view of the module shown in FIG. 1.
Figure 1:
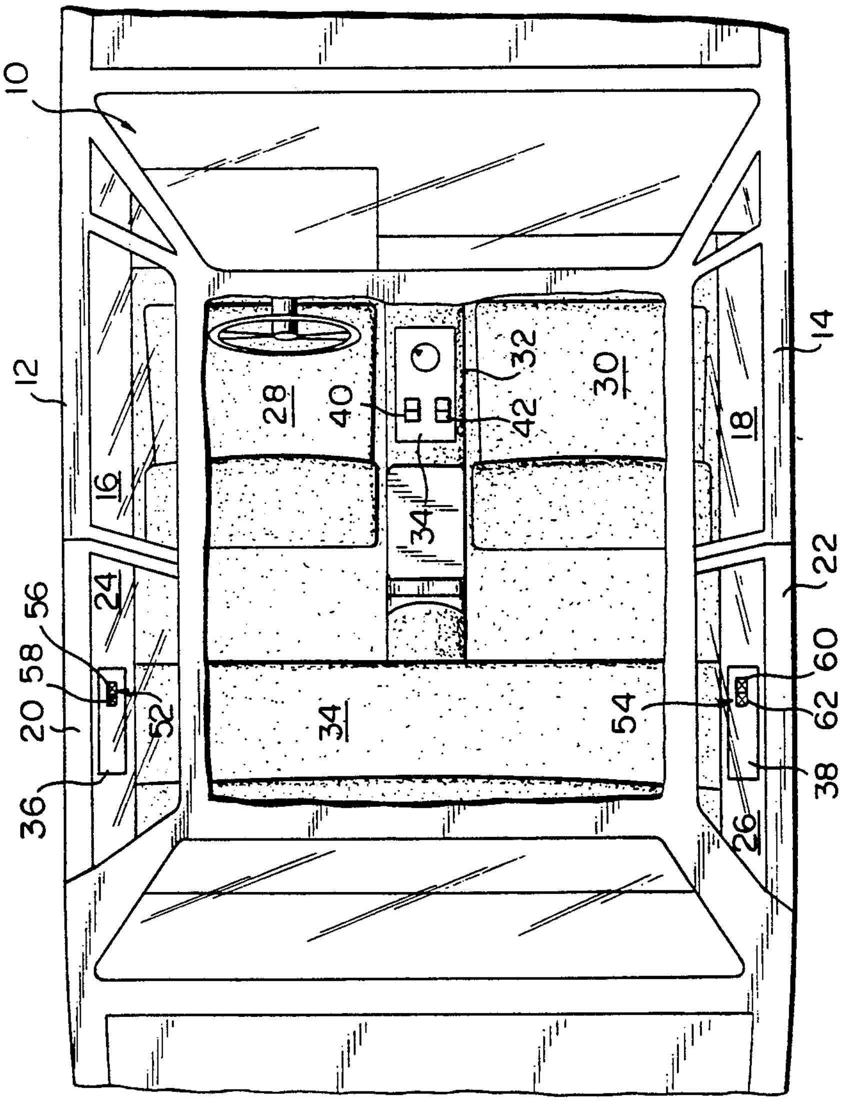
FIG. 1 is a perspective view of the cabin of a four door automobile having a window control module configured in accordance with the principles of the instant invention.

Referring now to FIGS. 1 and 2 of the drawings, there is shown a cabin 10 of an automobile body, which cabin includes left and right front doors 12 and 14, which front doors include left and right front power windows 16 and 18. The cabin 10 also includes left and right rear doors 20 and 22 which include rear power windows 24 and 26. Proximate the left front door 12 and left front window 16, there is a driver's seat 28, while proximate the right front door 14 and right front window 18, there is a passenger seat 30. In accordance with a preferred embodiment of the invention, disposed between the front seats 28 and 30, there is a console 32 which has a control module 34 thereon. A rear bench seat or a pair of bucket seats 35 extend between the rear doors 20 and 22. Mounted on the left rear door 20, there is a left control module 36 and on the right rear door 22, there is a right control module 38.

The modules 34, 36 and 38 each include switches for controlling the windows 16, 18, 24 and 26. In accordance with the principles of the instant invention, the console module 34 includes a left window operating switch 40 and a right window operating switch 42. The left window operating switch 40 has a first button 44 for raising the associated left front window 16 and a second button 46 for lowering the left front window, while the right switch 42 has a first button 48 for raising the right front window 18 and a second button 50 for lowering the right front window. The rear module 36 has a left operating switch 52, while the right rear module 38 has a right operating switch 54. The left, rear switch 52 has a first button 56 for raising the left rear window 24 and a second button 58 for lowering the left rear window, while the right switch 54 has a first button 60 for raising the right rear window 26 and a second button 62 for lowering the right rear window 26. While the term "button" is utilized, it is to be understood that the button pairs 44, 46; 48, 50; 56, 58; and 60, 62 may also be opposite ends of rocker switches or conventional double-pole double-throw (DPDT) switches.

In accordance with the principles of the instant invention, a mode selection switch 70 with a pointer 71 is mounted on the console module 34 and is rotatable between first and second positions 72 and 74, respectively, to select first and second operating modes. In the first operating mode, the switches 40 and 42 operate the left and right windows 16 and 18, respectively, the switch 52 on the rear door 20 operates the left rear window 24 and the switch 54 on the right rear door 22 operates the right rear window 26.

When the mode selection switch 70 is in second position 74, the second mode occurs wherein the left and right rear switches 52 and 54 in effect are disabled so that a person, such as a child sitting in the back seat 35, cannot operate the left and right rear windows 24 or 26. While the circuitry is in the second mode, the driver in the driver's seat 28 or a passenger in the front seat 30 cannot raise and lower the left and right front windows 16 and 18 by operating the left and right front switches 40 and 42, but can raise and lower the rear windows 24 and 26.

Figure 3:
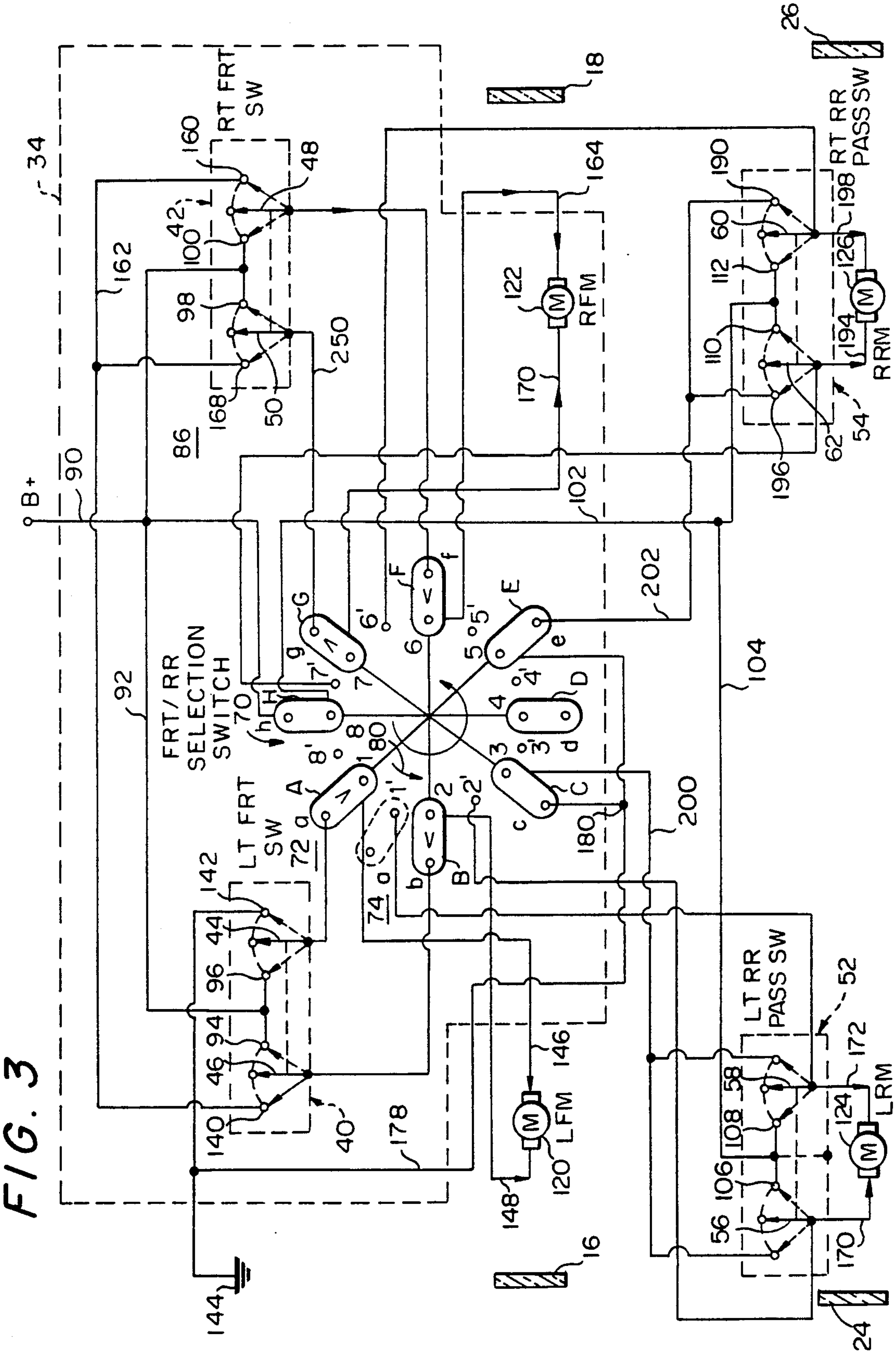
FIG. 3 is a schematic view of a circuit diagram illustrating a power and control circuit for operating electric window motors in accordance with the instant invention, wherein the circuit is in a first mode.
Figure 4:
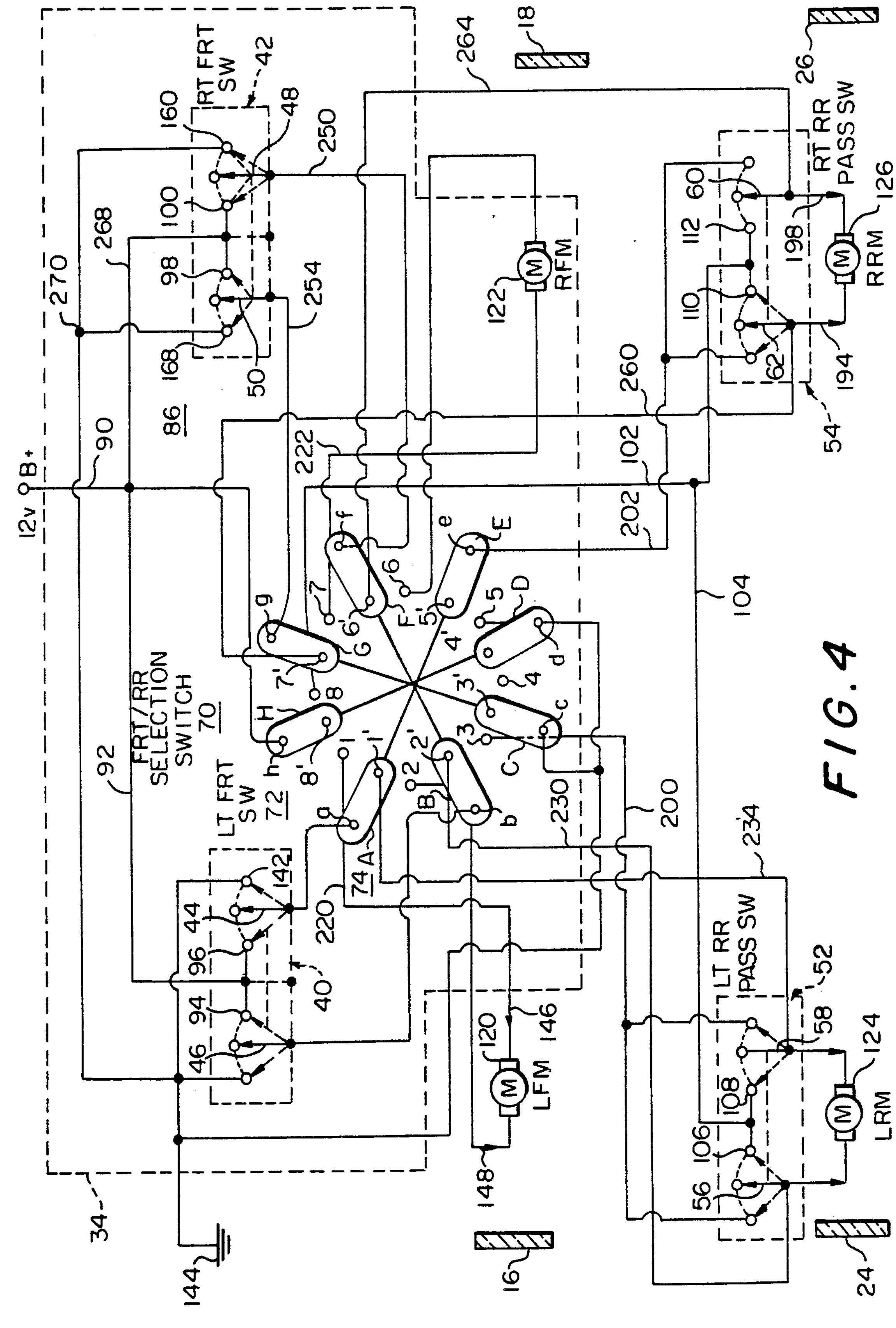
FIG. 4 is a circuit diagram similar to FIG. 3 but showing the circuit in a second mode.

Referring now to FIGS. 3 and 4, it is seen that the mode selection switch 70 is preferably a double throw, 8-pole rotary switch having a knob with a pointer 71 rotatable between the first position 72, shown in FIG. 3, and a second position 74, shown in FIG. 4, the positions being about 45° apart. As is seen in FIG. 3, the switch 70 is rotatable from the first position 72 to the second position 74 through a 45° arc as indicated by arrow 80. As is shown in FIG. 4, the mode selection switch 70 is rotatable from the second position 74 back to the first position 72 through a 45° arc in the direction of arrow 82. The rotary mode selection switch 70 has eight terminals A–H rotated therein to connect either terminals 1–8 to terminals a–h or terminals 1'–8' to terminals a–h.

In both FIGS. 3 and 4, a power and control circuit 86 is illustrated in which 12-volt dc current is supplied over line 90, through line 92 to contacts 94 and 96 in left front operating switch 40 and contacts 98 and 100 in right front operating switch 42. Line 102 conducts current via line 104 to contacts 106 and 108 in left rear operating switch 52 and contacts 110 and 112 in right rear operating switch 54. In FIG. 3, the rotary mode selection switch 70 enables operation of the left and right front windows 16 and 18 by left and right front electric motors 120 and 122 when operating the front switches 40 and 42, and operation of the left and right rear windows 24 and 26 by the left and right electric motors 124 and 126 when operating the left and right rear switches 52 and 54.

When the rotary mode selection switch 70 is rotated to the second position 74 so that the second mode (FIG. 4) occurs in the circuit 86, then the rear operating switches 52 and 54 are electrically disconnected from the rear motors 124 and 126, which raise and lower the left and right rear passenger windows 24 and 26, respectively. The rear motors 124 and 126 are, instead, connected to the front operating switches 40 and 42 through the rotary mode selection switch 70 to raise and lower the rear windows 24 and 26 while being disconnected from the motors 120 and 122 which operate the front windows 16 and 18.

Referring now specifically to FIG. 3, it is seen that when the rotary mode selection switch 70 is in the first position 72, rather than with the second position 74, contact A in the mode selection switch connects terminal a to terminal 1, while contact B connects terminal b to terminal 2. This allows current to flow through the left front motor 120 to raise and lower the left front window 16 when the switch 40 is operated.

In the preferred embodiment, the switch 40 is a rocker switch so that in order to raise the left front window 16, button 44 is pressed, closing contact with terminals 142 and 94. This connects the circuit 86 to ground 144 with current flowing in a first direction 146. When button 46 is pressed, contact is closed with terminals 140 and 96, causing current to flow to ground in the opposite direction of arrow 148 through the motor 120, lowering the left front window 16. Since the buttons 48 and 50 of the right front switch 42 are in their open position, current does not flow through the right front motor 122 upon operation of the left operating switch 40.

Right front window 18 is raised and lowered by the right front motor 122 in essentially the same manner as left front motor 120 raises and lowers left front window 16, the only difference being that current flows through contacts G and F instead of contacts A and B. In order to raise the right front window 18, switch 48 is pressed to close contact with terminal 160 so that switch 50 closes contact with terminal 98. This causes current to flow through the right front motor 122 from ground 144 by line 162 in the direction of arrow 164. When the button 50 is pressed, contact 168 is closed causing current to flow through the right front motor 122 from ground in the direction of arrow 170, thereby lowering the right front window 18. Since the contacts 94, 96, 140 and 142 of left front switch 40 are open, the current does not flow through to the left front motor 120 so that left front motor is isolated from the circuit upon operating the right front operating switch 42.

When the rotary mode selection switch 70 is in the first mode of FIG. 3, the motors 124 and 126 which raise and lower the left rear and right rear windows 24 and 26, respectively, are operated by the switches 52 and 54, respectively, through the contacts C and E in the mode selection switch. When button 58 is pressed, current flows through the contact C in the direction of arrow 170 to raise the left rear window 24. When the button 56 is pressed, the current flows in the opposite direction through contact C in the direction of arrow 172 to lower the left rear window 24. The terminal c connects the motor to ground 144 through line 178 via connection point 180.

The right rear passenger window 26 raised by the right rear motor 126 is raised by pressing on button 60 to close contact 190 and contact 110 so that current flows through the motor 126 in the direction of arrow 194 to raise the right rear passenger window 26. To lower the right rear passenger window 26, button 62 is pressed to close contact 196 so that current flows in the direction of arrow 198 through the right rear motor 126 to ground 144.

Accordingly, it is seen that the circuit 86, when the first mode of FIG. 3, allows back seat passengers to raise and lower the left and right rear windows 24 and 26 by operating the left and right rear operating switches 52 and 54, respectively, while the front seat passengers raise and lower the left and right front windows 16 and 18 by operating the left and right front window switches 40 and 42.

Referring now to FIG. 4 in conjunction with FIG. 5 where the rotary switch 70 is in the second mode with the arrow 71 aligned with position 74, left rear switch 52 and right rear switch 54 are disconnected from ground 144 because lines 200 and 202 connected to contacts C and E in rotary mode selection switch 70 are open. This is because left rear operating switch 52 is connected to open contact 3 by line 200 and right rear operating switch 54 is connected to open contact 5′ by line 202. Consequently, the rear operating switches 52 and 54 are disabled because they cannot conduct current from line 104 to ground 144.

When in the second mode, the left and right front operating switches 40 and 42 are disconnected from the front motors 120 and 122, respectively, because line 220 from motor 120 is connected to now open terminal 1 in the rotary switch 70 while line 222 connects right front motor 122 to open terminal 7 and line 224 to open terminal 6 in the rotary switch 70.

When the circuit 86 is in the second mode, the left rear motor 124 is operated by the left front operating switch 40. When up button 44 is pressed, contact 94 is closed by ganged button 46 connecting line 204 to contact B in switch 70 which is in turn connected to line 230. Line 230 leads directly through the left rear motor 124 and is connected by return line 234 through contact A and button 44 to ground 144. The motor 124 therefore rotates in a direction to raise the left rear window 24. When the down button 46 is pressed, current flows in the opposite direction along the aforedescribed path to lower the left rear window 24.

The right front operating switch 42 operates in a substantially identical fashion as the left front operating switch 40 when the circuit 86 is operating in the second mode. Upon pressing up button 48 in front operating switch 42 to raise the right rear window 26, terminals 160 and 98 are closed because button 48 is ganged with button 50. This causes current to flow in the direction of arrow 198 through right rear motor 126 by flowing through line 250, contact F in rotary switch 70, through line 252 and to terminal 98 via contact G and line 254. In order to lower right rear window 26, button 50 in front operating switch 42 is pressed which causes current to flow in the opposite direction 194 from terminal 168 through contact G, line 252, right rear motor 126 and back to terminal 100 via line 264, contact F and line 250.

In order to prevent a short circuit from occurring should the rear operating switches 52 and 54 be operated simultaneously with the front operating switches 40 and 42 when the circuit 86 is in the second mode, power line 90 is disconnected from line 102 by open terminal 8 in the switch 70. This is because contact H disconnects terminal h from terminal 8 when the switch 70 is rotated to the second position 74.

Again, when the circuit 86 is in the second mode of FIG. 4, rear operating switches 52 and 54 are disabled while front motors 120 and 122 are disconnected and rear motors 124 and 126 are connected to the front operating switches 40 and 42.

While utilizing the aforedescribed circuitry, only three switches, the rotary switch 70 and the operating switches 40 and 42 (which may be rocker switches), need be operated by the driver in seat 28 in order to lower the front and back windows 16, 18, 24 and 26 from the front of the vehicle, while simultaneously enabling the driver or front seat passenger in effect to lock the rear windows from the front of the vehicle.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A system for operating power windows in a vehicle having left and right front power windows proximate left and right front seats, the left and front power windows being raised and lowered by left and right electric motors, respectively; left and right rear power windows proximate left and right rear seats, the left and right rear power windows being raised and lowered by left and right electric motors, respectively, the system comprising:

a module mounted in a console located proximate the front seats, the module having left and right front operating switches for normally operating the left and right front windows and a mode selection switch movable between a first position in which the system is in a first mode and a second position in which the system is in a second mode;

left and right rear operating switches for the left and right rear windows, the left and right rear operating switches being located proximate the rear seats;

a power and control circuit having a power source and ground with the mode selection switch disposed in the power circuit, wherein the power and control circuit includes:

means for connecting each of the motors and the operating switch associated therewith to the power circuit so that the current flows from the power source to ground through the selected operating switches and motors when the mode selection switch is in the first position to select the first mode, and means for connecting the left and right rear motors for the left and right rear power windows to the power source and to ground through the left and right front operating switches, respectively, while disconnecting the left and right front electric motors from the power circuit and disconnecting the left and right rear operating switches from the power circuit when the mode selection switch is in the second position to select the second mode, whereby the rear windows are operated only by the left and right front operating switches.

2. The system of claim 1, wherein the mode selection switch is a rotary switch and the operating switches are pushbutton switches.

3. The system of claim 1, wherein the mode selection switch is a rotary switch and the operating switches are rocker switches.

4. The system of claim 1, wherein the mode selection switch is a rotary switch having at least six terminals therein which connect all electric motors to the power circuit through the associated operating switch when the mode selection switch is in the first position ;and wherein the rotary switch has terminals therein which connect the electric motors for the front windows to open lines and terminals which connect the rear switches to open lines, other terminals which connect the rear switches to open lines, and terminals which connect the front switches to the rear motors when the mode selection switch is in the second mode.

5. The system of claim 4, wherein there is a power line connected to both the left and right front switches and the left and right rear switches and wherein the power and control circuit includes means for interrupting power to the rear switches when the mode selection switch is in the second position to place the system in the second mode.

6. The system of claim 5, wherein the means for interrupting power to the rear operating switches is within the mode selection switch.

7. The system of claim 1, wherein the mode selection switch is movable between only two positions, one of which permits operation of the front windows and the other of which permits operation of the rear windows.

* * * * *